(12) United States Patent
Chen et al.

(10) Patent No.: US 10,821,671 B2
(45) Date of Patent: Nov. 3, 2020

(54) ULTRAFAST LASER FABRICATION METHOD AND SYSTEM

(71) Applicant: The Chinese University of Hong Kong, Hong Kong (CN)

(72) Inventors: Shih-Chi Chen, Hong Kong (CN); Qiang Geng, Hong Kong (CN); Dien Wang, Hong Kong (CN); Pengfei Chen, Hong Kong (CN); Dapeng Zhang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 16/290,743

(22) Filed: Mar. 1, 2019

(65) Prior Publication Data
US 2019/0193330 A1 Jun. 27, 2019

Related U.S. Application Data

(63) Continuation of application No. 14/860,461, filed on Sep. 21, 2015, now Pat. No. 10,401,603.
(Continued)

(51) Int. Cl.
 *H04N 7/18* (2006.01)
 *B29C 64/277* (2017.01)
 (Continued)

(52) U.S. Cl.
 CPC .......... *B29C 64/277* (2017.08); *B29C 64/135* (2017.08); *B29C 64/268* (2017.08); *B33Y 10/00* (2014.12); *G03H 1/0005* (2013.01); *G03H 1/2205* (2013.01); *B33Y 30/00* (2014.12); *G03H 2001/0094* (2013.01);
 (Continued)

(58) Field of Classification Search
 CPC ... B29C 64/277; B29C 64/268; B29C 64/135; G03H 1/2205; G03H 1/0005; G03H 2001/221; G03H 2001/2218; G03H 2222/33; G03H 2225/24; G03H 2222/36;
 (Continued)

(56) References Cited

U.S. PATENT DOCUMENTS 8,320,031 B1 * 11/2012 Sox ...................... G03H 1/0005
 250/201.9
2008/0218817 A1 * 9/2008 Grygier .................. G03H 1/028
 359/9
(Continued)

OTHER PUBLICATIONS

K. Dholakia, et al.; "Shaping the future of manipulation" Nature Photonics, vol. 5, Jun. 2011; pp. 335-342.
(Continued)

*Primary Examiner* — Richard T Torrente
(74) *Attorney, Agent, or Firm* — Knobbe Martens Olson & Bear LLP

(57) ABSTRACT

A laser fabrication method and a laser fabrication system. The laser fabrication system includes an ultrafast laser source configured to output a laser beam; and a digital micromirror device (DMD), configured to receive, shape, and scan the laser beam, wherein more than one binary holograms are synthesized to form a scanning hologram applied to the DMD. The shaped laser beam, containing one or multiple focal points, leaving the DMD, are focused to the sample for fast laser fabrication.

16 Claims, 7 Drawing Sheets
(5 of 7 Drawing Sheet(s) Filed in Color)

Related U.S. Application Data

(60) Provisional application No. 62/639,245, filed on Mar. 6, 2018.

(51) Int. Cl.

| | | |
|---|---|---|
| *B29C 64/268* | (2017.01) | |
| *B29C 64/135* | (2017.01) | |
| *B33Y 10/00* | (2015.01) | |
| *G03H 1/00* | (2006.01) | |
| *G03H 1/22* | (2006.01) | |
| *B33Y 30/00* | (2015.01) | |

(52) U.S. Cl.
CPC ............... *G03H 2001/221* (2013.01); *G03H 2001/2218* (2013.01); *G03H 2222/33* (2013.01); *G03H 2222/36* (2013.01); *G03H 2223/24* (2013.01); *G03H 2225/24* (2013.01)

(58) Field of Classification Search
CPC ....... G03H 2223/24; G03H 2001/0094; B33Y 10/00; B33Y 30/00
See application file for complete search history.

(56) References Cited

U.S. PATENT DOCUMENTS

| | | | |
|---|---|---|---|
| 2009/0238217 A1 | 9/2009 | Moser et al. | |
| 2012/0069344 A1 | 3/2012 | Liu | |
| 2013/0003073 A1* | 1/2013 | Yu .................. | G01N 21/453 356/457 |
| 2016/0199935 A1 | 7/2016 | Chen et al. | |
| 2016/0274539 A1* | 9/2016 | Smithwick ........... | G03H 1/0005 |

OTHER PUBLICATIONS

Shu Jia, et al.; "Isotropic three-dimensional super-resolution imaging with a self-bending point spread function" Nature Photonics | vol. 8 | Apr. 2014, pp. 302-306.
Planchon, et al.; "Rapid three-dimensional isotropic imaging of living cells using Bessel beam plane illumination" Nature Methods | vol. 8 No. 5 | May 2011 1 pp. 417-426.
Fernández-Suárez, et al.; "Fluorescent probes for super-resolution imaging in living cells" Nature Reviews | Molecular Cell Biology; vol. 9, Dec. 2008, pp. 929-943.
Vaughan, et al.; "New fluorescent probes for super-resolution imaging" Nature Biotechnology, vol. 29, No. 10, Oct. 2011, pp. 880-881.
R. Kodama, et al.; "Fast heating of ultrahigh-density plasma as a step towards laser fusion ignition" Nature, vol. 412, Aug. 23, 2001, pp. 798-802.
McLeod, et al.; "Subwavelength direct-write nanopatterning using optically trapped microspheres" Nature Nanotechnology, vol. 3, Jul. 2008, pp. 413-417.
Hahn, et al.; "Real-time digital holographic beam-shaping system with a genetic feedback tuning loop" Applied Optics, vol. 45, No. 5, Feb. 10, 2006, pp. 915-924.
Bahk, et al.; "A high-resolution, adaptive beam-shaping system for high-power lasers" Optics Express, vol. 18, No. 9, Apr. 26, 2010, pp. 9151-9163.
Fatemi, et al.; "Generation of hollow beams by using a binary spatial light modulator" Optics Letters, vol. 31, No. 7, Apr. 1, 2006, pp. 864-866.
Chattrapiban, et al.; "Generation of nondiffracting Bessel beams by use of a spatial light modulator" Optics Letters, vol. 28, No. 22, Nov. 15, 2003, pp. 2183-2185.
Bagnoud, et al.; "Independent phase and amplitude control of a laser beam by use of a single-phase-only spatial light modulator" Optics Letters, vol. 29, No. 3, Feb. 1, 2004, pp. 295-297.
M. Reicherter, et al.; "Optical particle trapping with computer-generated holograms written on a liquid-crystal display" Optics Letters, vol. 24, No. 9, May 1, 1999; pp. 608-610.
H. Kück, et al.; "Deformable micromirror devices as phase-modulating high-resolution light valves" Sensors and Actuators A 54, (1996) pp. 536-541.
Nemoto, et al.; "Optimum control of the laser beam intensity profile with a deformable mirror" Applied Optics, vol. 36, No. 30, Oct. 20, 1997; pp. 7689-7695.
Gong, et al.; "Observation of the asymmetric Bessel beams with arbitrary orientation using a digital micromirror device" Optics Express, vol. 22, No. 22, Nov. 3, 2014; pp. 26763-26776.
Lerner, et al.; "Shaping Laguerre-Gaussian laser modes with binary gratings using a digital micromirror device" Optics Letters, vol. 37, No. 23, Dec. 1, 2012; pp. 4826-4828.
Dufour, et al.; "Two-photon excitation fluorescence microscopy with a high depth of field using an axicon" Applied Optics, vol. 45, No. 36, Dec. 20, 2006; pp. 9246-9252.
A. Piskarskas, et al.; "Noncollinear second-harmonic generation in periodically poled KTiOPO4 excited by the Bessel beam" Optics Letters, Vo. 24, No. 15, Aug. 1, 1999; pp. 1053-1055.
Polynkin, et al.; "Curved Plasma Channel Generation Using Ultraintense Airy Beams" Science vol. 324, Apr. 10, 2009; pp. 229-232.
Gattass, et al.; "Femtosecond laser micromachining in transparent materials" Nature Photonics, vol. 2, Apr. 2008; pp. 219-225.
Chong, et al.; "Airy—Bessel wave packets as versatile linear light bullets" Nature Photonics, vol. 4, Feb. 2010; pp. 103-106.
Akturk, et al.; "Pulse-front tilt caused by spatial and temporal chirp" Optics Express, vol. 12, No. 19, Sep. 20, 2004; pp. 4399-4410.
Wai-Hon Lee; "Binary Synthetic Holograms" Applied Optics, vol. 13, No. 7, Jul. 1974; pp. 1677-1682.
Bryngdahl, et al.; "Laser beam scanning using computer-generated holograms" Applied Optics, vol. 15, No. 1, Jan. 1976; pp. 183-194.
Reddy, et al.; "Three-dimensional random access multiphoton microscopy for functional imaging of neuronal activity" Nature Neuroscience, vol. 11, No. 6, Jun. 2008; pp. 713-720.

\* cited by examiner

ULTRAFAST LASER FABRICATION METHOD AND SYSTEM

CROSS REFERENCE TO RELATED APPLICATIONS

This application is a continuation-in-part of U.S. patent application Ser. No. 14/860,461 filed on Sep. 21, 2015, and claims priority to U.S. Provisional Application No. 62/639,245 filed on Mar. 6, 2018 the entire contents of which are incorporated herein by reference.

TECHNICAL FIELD

The present application relates to an ultrafast laser fabrication system.

BACKGROUND

Two-photon polymerization is an important additive manufacturing method that is typically performed via raster-scanning the focus of a femtosecond laser in photoresists, thereby inducing a nonlinear absorption process to polymerize submicron features as nanoscale building blocks. Although it enables nanoscale features to be additively created, the processing rate is limited by the point-by-point and layer-by-later serial scanning procedure. While parallel processing methods have been proposed, e.g., microlens array or spatial light modulator, they are often limited to fabricating periodic structures or have compromised resolution. It is desired to have a solution of substantially improved throughput (multi-point writing) and writing capability (random-access scanning) without sacrificing the fabrication resolution.

SUMMARY

In the present application, a laser fabrication method and the associated optical system are proposed in which the binary hologram-based technique is used to perform multi-point laser point control with simultaneously beam shaping and wavefront correction using a single DMD.

According to an embodiment of the present application, the laser fabrication system comprises: an ultrafast laser source, configured to output a laser beam; a digital micromirror device (DMD), configured to receive and shape the laser beam, wherein more than one binary holograms are synthesized (or superposed) to form a scanning hologram applied to the DMD; the shaped laser beam leaving the DMD is focused to photoresists for fabrication of single or multiple points in parallel. Since more than one binary holograms are synthesized to form the scanning hologram which is applied to the DMD, i.e., one or multiple focal points can be generated by a single hologram, multi-focal point scanning can be achieved by using a single DMD.

According to an embodiment, since the DMD may introduce negative angular dispersion to the laser beam, the system may further comprise a dispersion compensation unit, configured to transfer the laser beam from the laser source to the DMD with a positive angular dispersion for neutralizing the negative angular dispersion. For example, the dispersion compensation unit includes a blazed transmission grating and a mirror.

According to an embodiment, wavefront information for wavefront correction is further included in the scanning hologram so that wavefront correction is achieved simultaneously with the beam shaping for the multi-focal point scanning.

According to an embodiment, the laser beam from the laser source may be expanded to match an aperture of the DMD.

According to an embodiment, the system may further comprise an objective lens via a set of relay optics such as a 4-f system, consisting of two lenses, configured to focus the shaped laser beam.

According to an embodiment, a spatial filter may be placed at a back focal plane of the relay optics such as the 4-f system to spatially select a non-zero order beam such as the −1st or +1st order beam diffracted from the hologram.

According to an embodiment, the system may further comprise a microscopic imaging system, configured to monitor fabrication processes performed by the shaped laser beams.

According to an embodiment, the system may further comprise a position stage, configured to mount and maneuver samples to be laser processed.

According to an embodiment, a method for laser fabrication comprises outputting a laser beam from a laser source; shaping the laser beam by a digital micromirror device (DMD) with a scanning hologram synthesized from more than one binary holograms; and focusing the shaped laser beam to photoresists for parallel fabrication with a single or multiple shaped laser points.

According to an embodiment, the method may further comprise neutralizing a negative angular dispersion that is introduced by the DMD to the laser beam.

According to an embodiment, wavefront information for wavefront correction is further included in the scanning hologram.

According to an embodiment, the method may further comprise spatially selecting a non-zero order, e.g., the −1st or +1st order diffraction of the scanning hologram.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

To realize high precision and high-throughput two-photon polymerization, a multi-focus DMD random-access scanner based on binary holography is proposed. Specifically, the DMD is used as a programmable binary mask, coded with holograms, to modulate the incident femtosecond laser wavefront. 3-D scanning can be achieved by using holographic patterns of spherical wavefronts with adjusted tilted phases. To enhance the scanning resolution, holograms for wavefront correction can be designed and synthesized to the scanning holograms, realizing simultaneous arbitrary beam shaping and 3-D laser scanning via a single DMD. By combining the individual focal points via superposition, multi-focus random-access scanning can be achieved. Accordingly, multi-focus scanning trajectory can be planned arbitrarily to fabricate structures with optimal mechanical properties. Parametric models and computer algorithms are also developed to deterministically link the system performance to DMD parameters. Fabrication experiments have been performed and proved the performance of the new multi-point laser writing system.

According to an embodiment of the present application, the laser fabrication system comprises an ultrafast laser source configured to output a laser beam; a digital micromirror device (DMD) configured to receive, shape, and scan the laser beam via synthesized binary holograms. The system may further include a position stage configured to mount the photoresists or sample. Since one or multiple focal points are generated by the hologram, fabrication with multiple focal points can be realized. Accordingly, the laser fabrication system can implement scanning of multiple focal points at the same time, significantly reducing the time for fabrication. Further, wavefront information for wavefront correction may also be included in the scanning hologram, so that wavefront correction is also achieved simultaneously with the beam shaping for the multi-focal point scanning.

The DMD will shape the laser beam with a negative angular dispersion. To neutralize the negative angular dispersion, a dispersion compensation unit may be provided between the DMD and the laser source so as to transfer the laser beam from the laser source to the DMD with a positive angular dispersion. For example, the dispersion compensation unit may include a blazed transmission grating and a mirror. The laser beam from the laser source may be expanded to match an aperture of the DMD.

In addition, the laser fabrication system may include an infinity-corrected objective lens via a 1:1 telescope, consisting of an achromatic lens and a tube lens, configured to focus the shaped laser beam on the photoresists. An iris diaphragm may be placed at a back focal plane of the achromatic lens to spatially select a −1st order diffraction of the scanning hologram.

Figure 1:
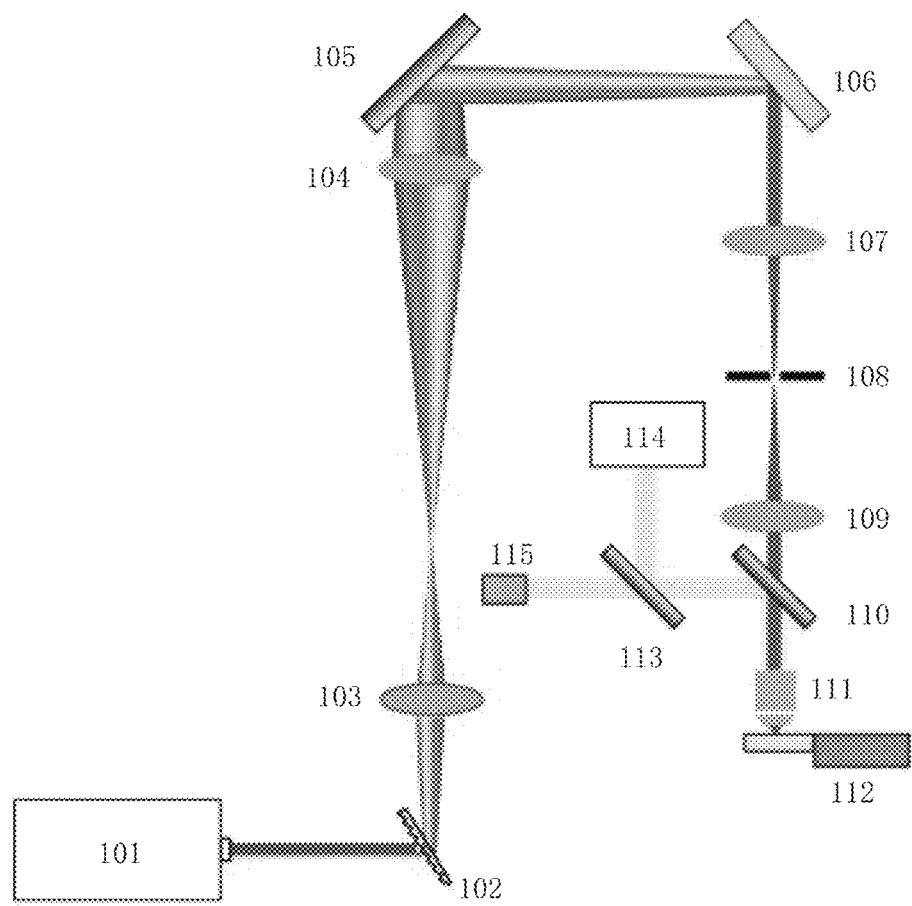
FIG. 1 presents the optical configuration of the DMD TPP fabrication system according to an embodiment of the present application.

An illustrative embodiment of the laser fabrication system of the present application is shown in FIG. 1. As an example, the laser source 101 is a regenerative femtosecond Ti:sapphire laser amplifier (Spectra-Physics, Spitfire Pro) with a center wavelength of 800 nm. The laser is configured to have a repetition rate of 10 kHz with 100 fs pulse width and 4 W average power. An alternative choice of the laser source may be a Ti:sapphire laser (Coherent, Chameleon Ultra II, 3.5 W at 800 nm; repetition rate: 80 MHz.). A conservative calculation indicates the laser amp can simultaneously process 100+ focal points with sufficient energy for TPP, while the oscillator can process 15 points.

First, the laser beam issued from the laser source 101 is appropriately expanded by two achromatic lenses (L1, L2) 103 and 104 to ensure the DMD aperture (DLP 4100 0.7" XGA, 1024×768 pixels, Texas Instrument) is fully filled. Lenses L1 and L2 together form a beam expander. As the DMD 106 functions both as a programmable binary hologram and a blazed grating, it introduces negative angular dispersion to the laser beam. To remove the angular dispersion, a blazed transmission grating 102 and a mirror (M1) 105 are included in the light path to generate positive angular dispersion. The blazed transmission grating 102 and the mirror (M1) 105 collectively function as a dispersion compensation unit. The mirror M1 105 may be a high-reflectivity mirror. After the DMD 106, the dispersion-free laser beam is guided to an infinity-corrected objective lens 111 via a 1:1 telescope, consisting of an achromatic lens L3 107 and a tube lens L4 109. An iris diaphragm 108 is placed at the back focal plane of L3 to spatially select the −1st order diffraction of the binary hologram. The photoresists are mounted on a motorized precision XYZ stage 112 for positioning. To monitor the fabrication process in situ, a microscopic imaging system may be built in conjunction with the fabrication setup. As shown in FIG. 1, the microscope shares the objective with the fabrication system via a dichroic mirror 110. An epi-illumination light source 115 is coupled into the system for sample illumination. The image/video of the fabrication process is recorded by a CCD camera 114 after the 50:50 beam splitter (BS) 113.

Hereinafter, feature of the laser fabrication system are described in details.

Dispersion Compensation

Dispersion compensation is critical to the DMD scanner and the related parameters can be determined mathematically. The general form of grating equation is given by $$d(\sin \theta_i + \sin \theta_m) = m\lambda, \quad (1)$$

where d is the distance of groove centers; m is an integer that specifies the diffraction order; $\theta_i$ and $\theta_m$ are incident angle and diffraction angle at the $m^{th}$ diffraction order respectively. Differentiating Eq. 1 yields the angular dispersion $\partial \theta_m / \partial \lambda = m/(d \cdot \cos \theta_m)$. Hence, the ratio of cone angles $\Delta \theta_G$ and $\Delta \theta_D$ can be written as $$\frac{\Delta \theta_G}{\Delta \theta_D} = \frac{m_G d_D \cos \theta_{iD}}{m_D d_G \cos \theta_{mG}}, \quad (2)$$

where the subscripts G and D denote the related parameters of the grating and DMD respectively. L1 and L2 form a 4-f optical configuration to expand the beam size and adjust the dispersion angle after the grating. Accordingly, the angular dispersion introduced by DMD is entirely compensated. As $\Delta \theta_G$ and $\Delta \theta_D$ are small, they can be approximated as:

$$\frac{\Delta \theta_G}{\Delta \theta_D} \approx \frac{f_{L2}}{f_{L1}}, \quad (3)$$

The important parameters in this setup include the central wavelength, $\lambda = 800$ μm; pixel size of the DMD, $d_D = 19.35$ μm; pitch of the grating, $d_G = 0.83$ μm; the diffraction order of the grating and DMD, $m_G = 1$ and $m_D = 10$ respectively; and the corresponding diffraction angle, $\theta_{mG} = 27°$, $\theta_{iD} = 17°$ respectively. Substituting these values into Eq. 2 and Eq. 3, there is a relationship $f_{L2}=2.5\times f_{L1}$, thus $f_{L1}=100$ mm and $f_{L2}=250$ mm may be chose to fully compensate the angular dispersion introduced by DMD. Note that when employing different DMD units or models or gratings, a suitable 4-f system can always be found to compensate the angular dispersion because $\theta_{iD}$ can be adjusted continuously.

Arbitrary Trajectory Planning

Figure 2A:
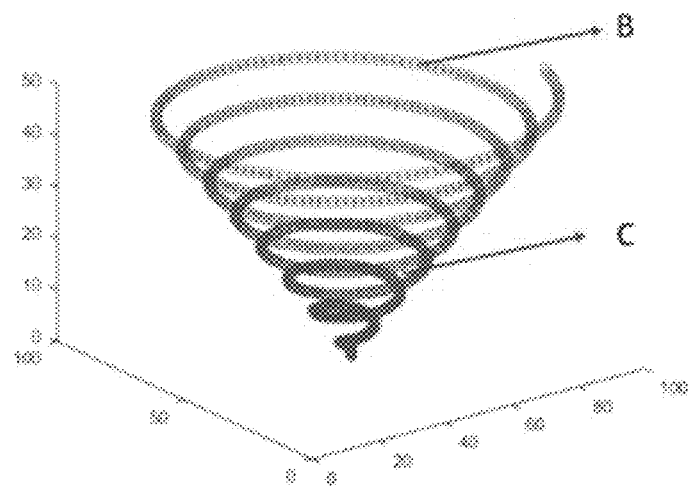
FIG. 2(a) shows an exemplary spiral path that can be achieved by the DMD scanner, where each point along the path corresponds to a different hologram.
Figure 2B:
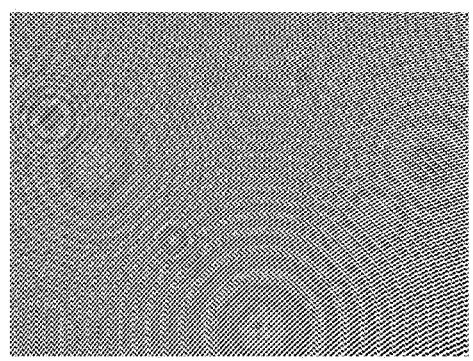
FIGS. 2(b) and 2(c) show the holograms of two different points on the scan path (B and C), respectively.
Figure 2C:
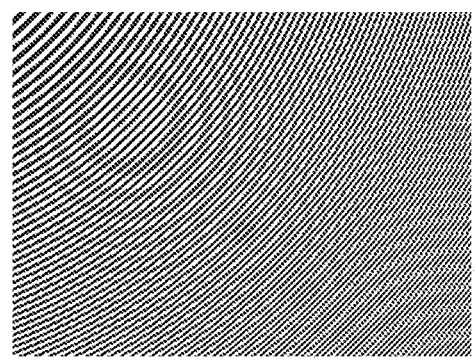

In conventional TPP systems, the fabrication process is achieved by a pair of galvanometric scanners that scans the x-y plane and a linear stage that moves the sample axially. For example, the commercial system from Nanoscribe GmbH (https://www.nanoscribe.de/). Accordingly, structures can only be fabricated in a layer-by-layer fashion, which limits the printing speed of complex structures. In contrast, the DMD-based TPP system can scan any trajectories (continuous or discontinuous) with an equal speed (22.7 kHz or 5 mm/s). Importantly, gray scale control can be easily achieved by extending the dwell time of the laser focal point at any selected points within the work volume of the DMD scanner. FIG. 2(a) shows an exemplary spiral path that can be achieved by the DMD scanner, where each point along the path corresponds to a different hologram. The holograms of two different points on the scan path (B and C) are shown in FIGS. 2(b) and 2(c), respectively.

Axial scanning may be realized by applying binary holograms of spherical wavefronts of increasing or decreasing focal lengths to the DMD; and lateral scanning may be realized by changing the tilted phase term in Lee hologram, i.e., R(x,y)/T, where R(x,y) determines the bias and tilted angle of the fringe patterns and T determines the period of the fringes. Accordingly, simultaneous axial and lateral scanning (i.e., 3-D random-access scanning) is achieved via superposing and rapidly modulating the designed binary holograms on the DMD. When pairing with a 40× objective, the DMD scanner has a scanning range of 103, 206, 524 microns in the X, Y, Z axes; and a scanning resolution (i.e., minimum step size) of 270 nm and 130 nm in the axial and lateral directions respectively.

Multi-Focus Scanning

Multiple focal points may be simultaneously generated by superposing holograms of individual focus in the DMD work space. To mathematically realize this, let $A(x,y)\cdot\exp[i\varphi(x,y)]$ be the target wavefront containing k focal points, where $A(x,y)\in L[0,1]$ and represent the amplitude and phase of the electric field; x and y are the coordinates in Cartesian coordinate system. Binary holograms with the desired intensity distribution among the k focal points may be synthesized via the equation below, which is derived based on Lee hologram:

$$h(i,j) = \begin{cases} 1, & -A(x,y) \le \sum_{k=1}^{n} B_k \sin\left(2\pi \frac{R_k(x,y)}{T_k} + \varphi_k(x,y)\right) \le A(x,y) \\ 0, & \text{otherwise} \end{cases} \quad (4)$$

where h(i, j) represents the binary value of the micromirrors on the DMD at (i, j). $B_k$, $R_k(x,y)$, $T_k$ and $\phi_k$ are the relative amplitude factor, tilted phase, grating period, and phase for the $k^{th}$ focal point respectively.

Importantly, via binary hologram, the intensity distribution among the focal points may be arbitrarily controlled, realizing single exposure grayscale control. Simultaneous multi-focus fabrication has been a long-sought goal in additive manufacturing as it substantially reduces the processing time. Comparing with the existing methods of multi-focus fabrication, which mainly combines spatial light modulators and mechanical scanners, the system according to the present application could achieve the goal with a single DMD.

Adaptive Wavefront Correction

Using the DMD-scanner, wavefront correction algorithms can be designed and added to the scanning holograms via superposition, enabling the point-specific wavefront optimization and minimizing the voxel sizes across the DMD work space. To perform wavefront correction, the system aberration is first measured by collecting a sequence of images at low exposure level in fluorescent solutions, and is then determined based on the modal wavefront sensing method, where the aberration is considered as a summation of orthogonal modes, e.g., Zernike polynomials (Note a EMCCD may be used for the calibration.). The quality metric may be set to be total intensity for the optimization. Basis modes are then chosen and converted to binary holograms and combined with the scanning holograms. Next, a sequential quadratic maximization process is applied to identify the optimal modal coefficients. Once the optimal modes are determined, the aberration measurement and correction are applied to the beam scanning and shaping holograms for high-speed TPP fabrication (22.7 kHz), i.e., the point-specific wavefront correction is applied to every point the DMD work space.

Accordingly, multi-point beam scanning and wavefront correction can be simultaneously performed. Note that all focal points generated by the DMD can be individually controlled (both location and intensity) and wavefront optimized. Mathematically, they can be described as:

$$h(i,j) = \begin{cases} 1, & -A(x,y) \le \sum_{k=1}^{n} B_k \sin\left(2\pi \frac{R_k(x,y)}{T_k} + \varphi_k(x,y) + \varphi_{w,k}(x,y)\right) \le A(x,y) \\ 0, & \text{otherwise} \end{cases}$$

Here $A(x,y)\cdot\exp[i\varphi(x,y)]$ is target wavefront containing k focal points, where $A(x,y)\in L[0,1]$ and $\varphi(x,y)$ represent the amplitude and phase of the electric field; x and y are the coordinates in Cartesian coordinate system. h(i, j) represents the binary value of the micromirrors on the DMD at (i, j). $B_k$, $R_k(x,y)$, $T_k$ and $\phi_k$ are the relative amplitude factor, tilted phase, grating period, and phase for the $k^{th}$ focal point respectively. $\phi_{w,k}$ is the additional wavefront information to be included in the hologram for controlling the size and shape of the focal points.

Experiments

A prototype system is developed for precision 3-D TPP printing based on ultrashort pulse laser and beam shaping. Preliminary experimental data show that the results are repeatable and achieve much higher throughput than any existing systems.

Figure 3A:
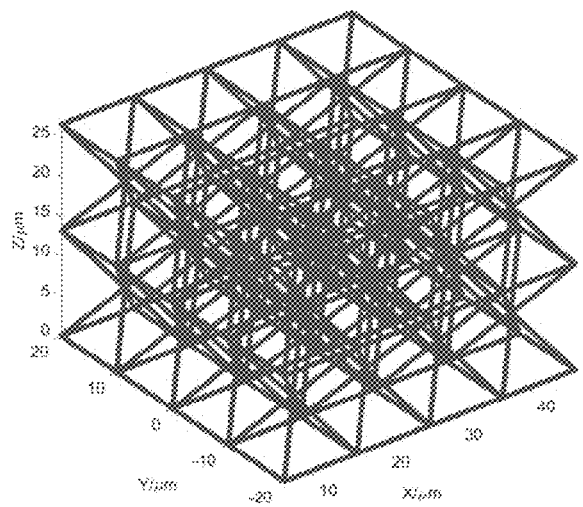
FIG. 3(a) shows planned trajectories for truss array according to an experiment of the present application.
Figure 3B:
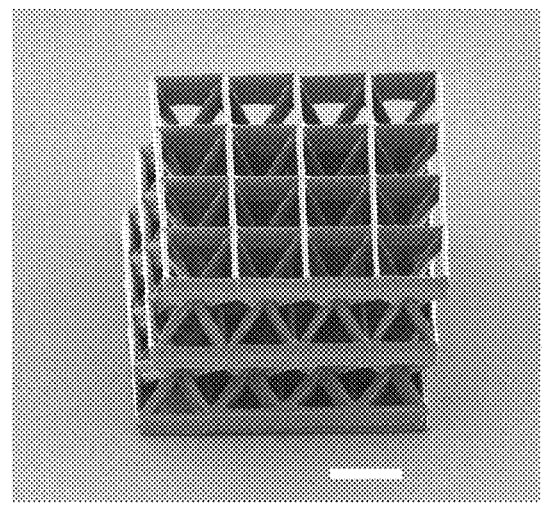
FIGS. 3(b)-3(d) show SEM results of truss arrays with different scale bars.
Figure 3C:
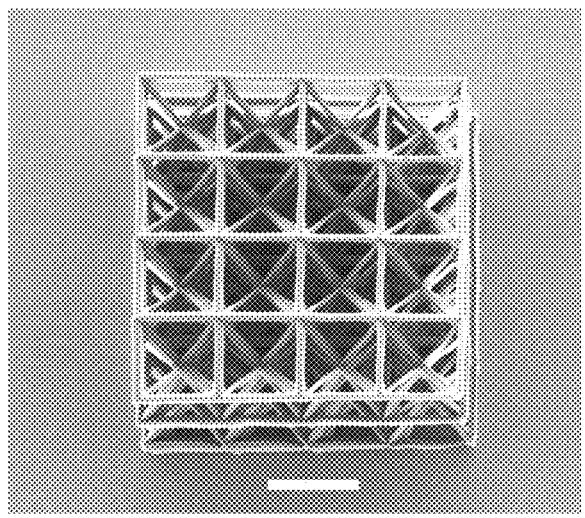
Figure 3D:
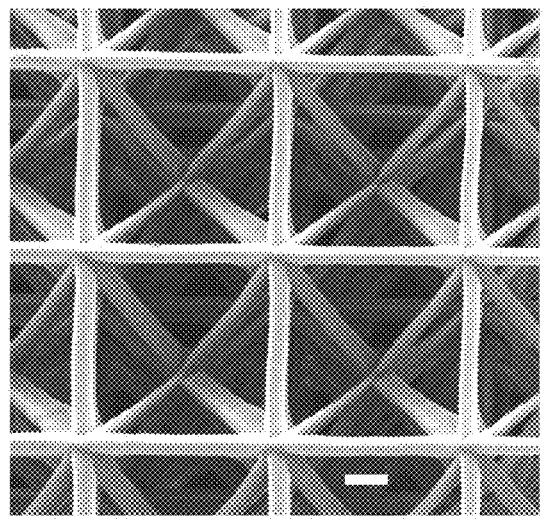
Figure 4A:
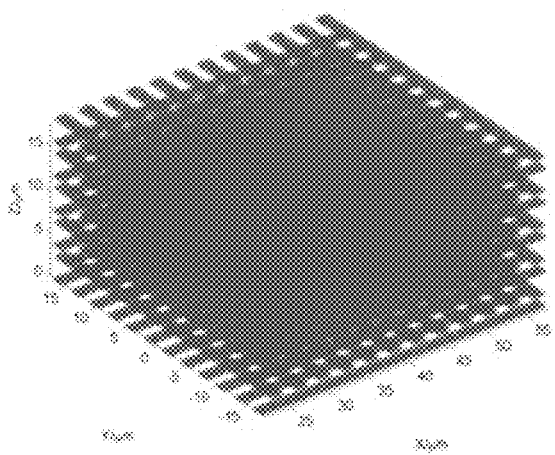
FIGS. 4(a)-4(d) are planned trajectories for single-, two-, three-, and four-focus fabrication of woodpile structures respectively.
Figure 4B:
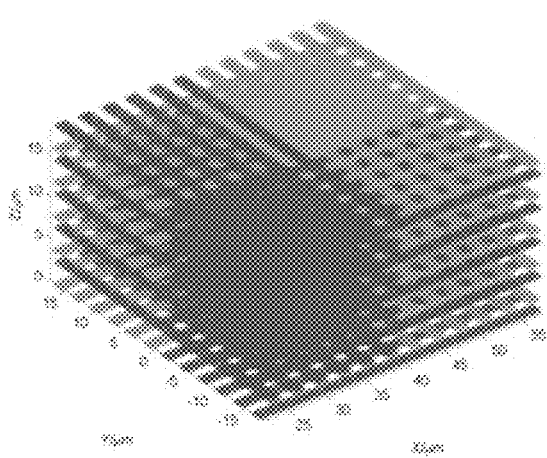
Figure 4C:
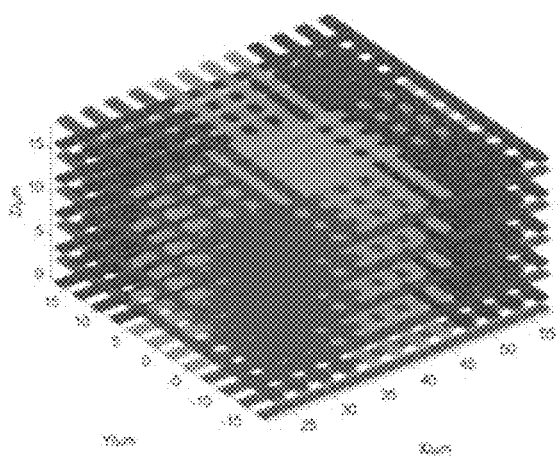
Figure 4D:
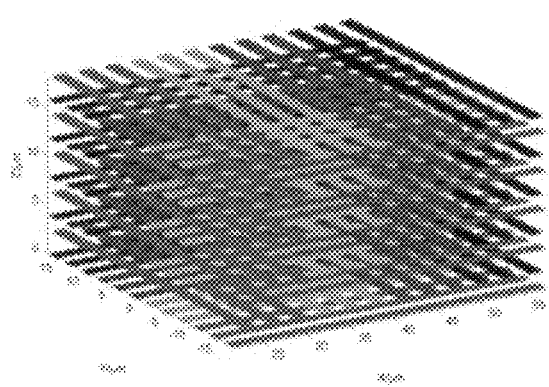

To validate the fabrication resolution and speed, truss arrays are fabricated, their trajectories are shown in FIG. 3(a). Each truss array consists of about 60,000 points, corresponding to about 60000 binary patterns, laser power was set at 30 mw, DMD worked at its maximum pattern rate (22.7 kHz). Under this condition, each truss was fabricated within 3 seconds. FIG. 3(b)-3(d) present the SEM images of the fabricated truss arrays at different magnification. The results show the system according to the present has achieved equal or better resolution than the state-of-the-art commercial system from Nanoscribe.

To demonstrate the multi-focus parallel fabrication capability, two, three, and four focal points are used respectively to fabricate the woodpiles. The programmed the scanning trajectories and the fabrication results are presented in FIG. 4 and FIG. 5 respectively.

FIGS. 4(a)-4(d) show planned trajectories for (a) single- (b) two- (c) three-, and (d) four-focus fabrication of woodpile structures, respectively.

Figure 5A:
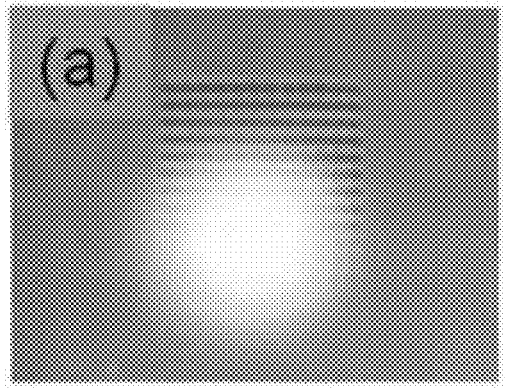
FIGS. 5(a)-5(d) present the images of single-, two-, three-, and four-focus fabrication processes respectively, collected by the CCD camera.
Figure 5B:
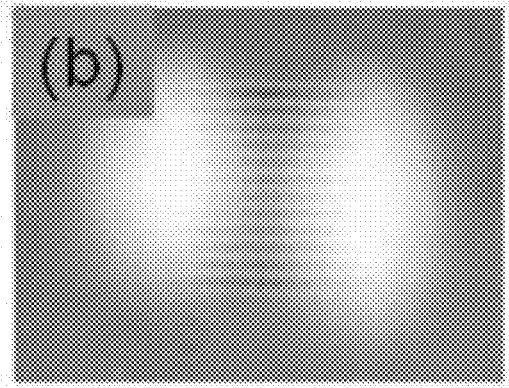
Figure 5C:
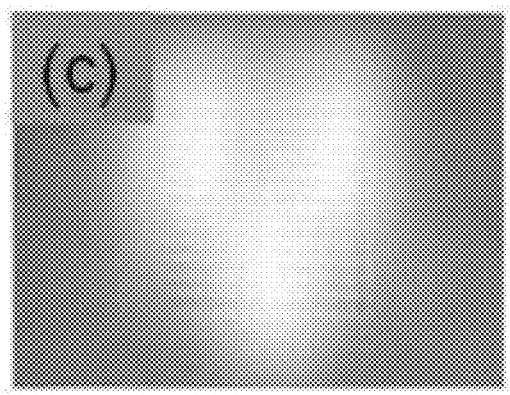
Figure 5D:
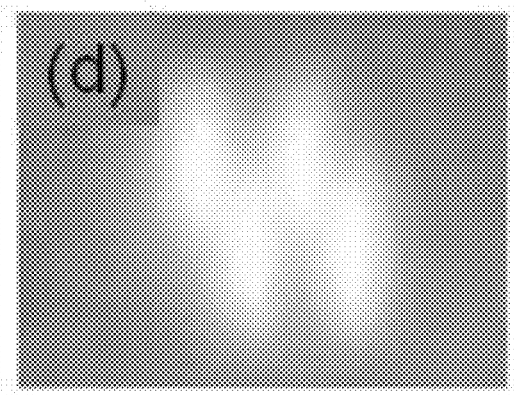
Figure 5E:
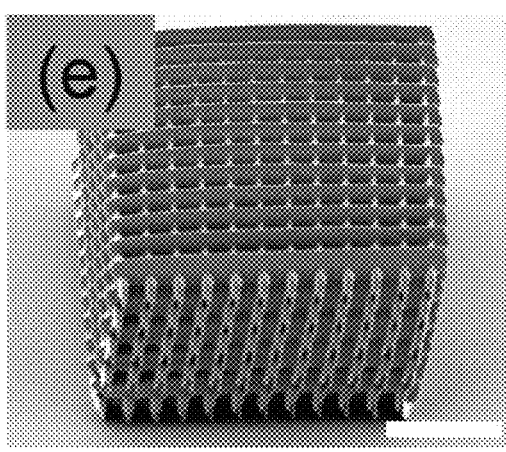
FIGS. 5(e) and 5(f) present the SEM image of the fabrication results after development.
Figure 5F:
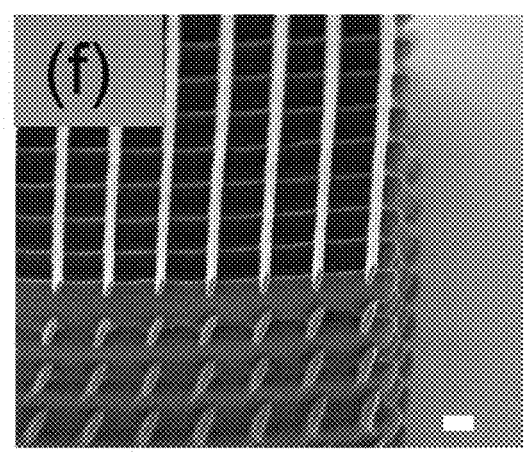

FIGS. 5(a)-5(d) present the images of single-, two-, three-, and four-focus fabrication processes respectively, collected by the CCD camera, where the multi focus capability can be clearly observed. FIGS. 5(e) and 5(f) present the SEM image of the fabrication results after development. The zoom-in image in FIG. 5(f) shows the details of the woodpile and confirm again the writing resolution (~500 nm, limited by diffraction).

Lastly, the DMD TPP system is used to fabricate a microscale London Bridge, demonstrating the capability of arbitrary path planning. First, the CAD model of the London Bridge is decomposed into a point array; each point in space corresponds to a specific binary hologram. Trajectories can be easily planned by arbitrarily arrange the hologram sequence in the DMD memory. For multi-point processing, selected holograms of selected points can be synthesized to generate a new hologram. Accordingly, the total number of hologram (or fabrication time) is reduced.

Figure 6A:
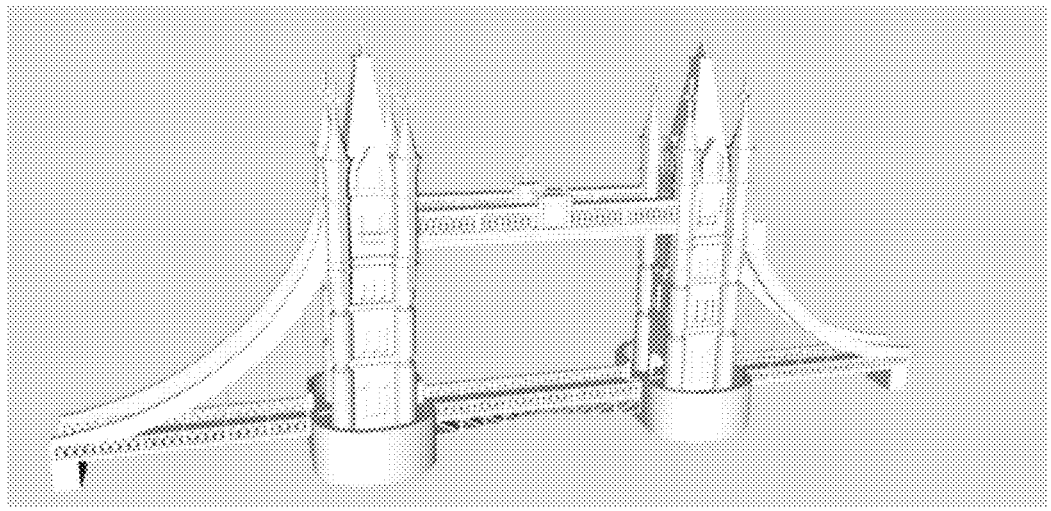
FIG. 6(a) shows a CAD model of the London Bridge.
Figure 6B:
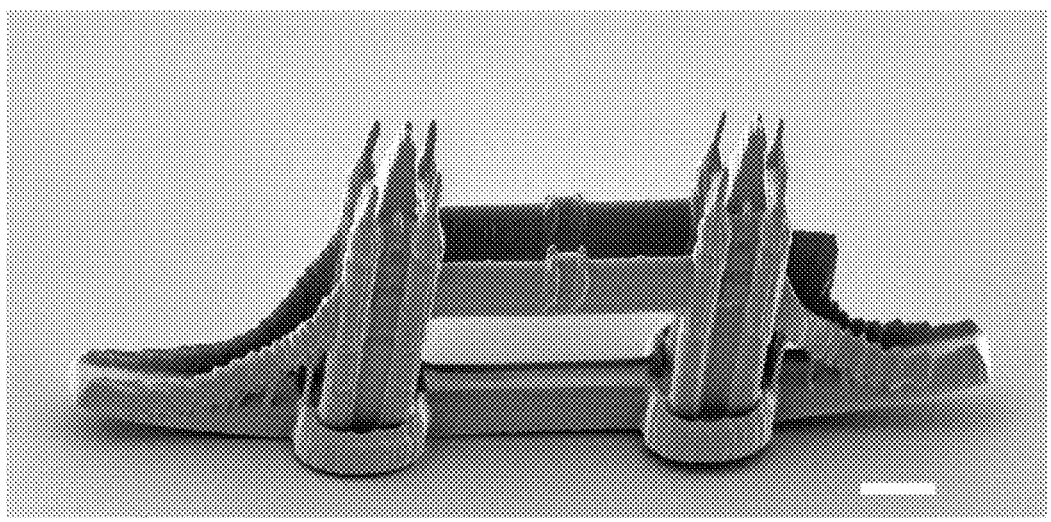
FIG. 6(b) is a TPP fabricated London Bridge.

FIGS. 6(a) and 6(b) present the CAD model and fabrication results of the London Bridge respectively. The London Bridge consists of 160,000 points (or binary patterns). For single point scanning, the fabrication time is 7 seconds only. The pixel dwell time is 44 μs.

According to the present application, with enough laser power, up to 100 points can be simultaneously generated and individually controlled for precision nano-fabrication, e.g., two-photon polymerization, thereby realizing high-throughput, high precision nano-fabrication.

Comparing with existing ultrashort laser based 3-D printing technologies, the laser fabrication system of the present application has the following distinct advantages: (1) arbitrary scanning trajectory in space, (2) high throughput, (3) multi-focus scanning, (4) superior accuracy and repeatability, (5) modification of mechanical and optical properties of printed structures, and (6) low cost.

It is understood that, on the basis of the laser fabrication system as described above, a laser fabrication method is also proposed in the present application. The laser fabrication method according to the present application may be implemented by the laser fabrication system as described above.

Figure 7:
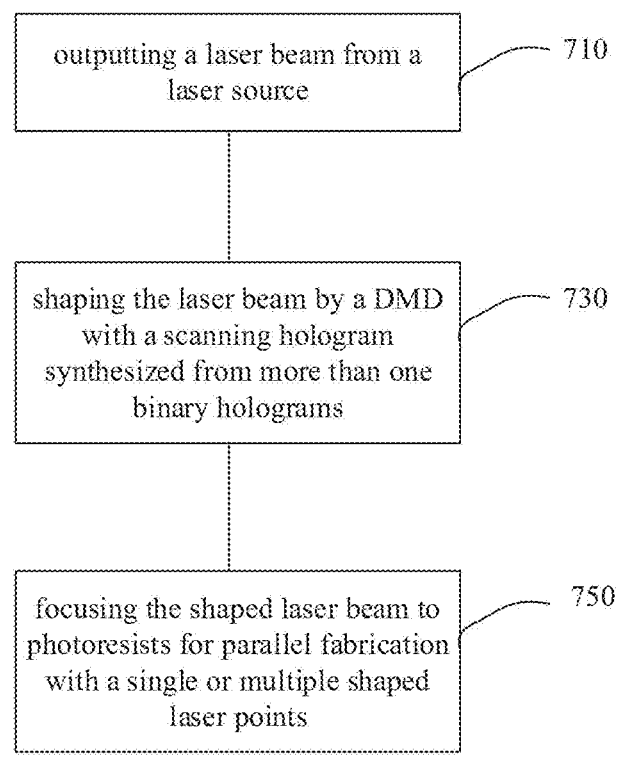
FIG. 7 illustrates a flow chart of a laser fabrication method according to an embodiment of the present application.

FIG. 7 illustrates a flow chart of a laser fabrication method according to an embodiment of the present application. As shown, at step 710, a laser beam is output from a laser source. At step 730, the laser beam is shaped by a digital micromirror device (DMD) with a scanning hologram synthesized from more than one binary holograms. At step 750, the shaped laser beam is focused to photoresists for parallel fabrication with a single or multiple shaped laser points. According to an embodiment, a step of neutralizing a negative angular dispersion that is introduced by the DMD to the laser beam is further included. According to an embodiment, wavefront information for wavefront correction is further included in the scanning hologram. According to an embodiment, a step of spatially selecting a −1st order diffraction of the scanning hologram may be further included, It is noted that all technical features described above for the laser fabrication system are also applicable to the laser fabrication method.

Although the preferred examples of the present application have been described, those skilled in the art can make variations or modifications to these examples upon knowing the basic inventive concept. The appended claims are intended to be considered as comprising the preferred examples and all the variations or modifications fell into the scope of the present application.

What is claimed is:

1. A laser fabrication system, comprising:
   a laser source configured to output a laser beam;
   a digital micromirror device (DMD), configured to receive and shape the laser beam with a scanning binary hologram, wherein the DMD functions as a programmable binary mask coded with the scanning binary hologram, and more than one binary hologram is synthesized to form the scanning binary hologram applied to the DMD; wherein the shaped laser beam leaving the DMD is focused to photoresists for parallel fabrication with a single or multiple shaped laser points; and
   a spatial filter, configured to select a non-zero order beam diffracted from the scanning binary hologram, wherein the non-zero order beam is a −1st or +1st order beam, wherein the selected non-zero order beam is focused to the photo-sensitive resins.

2. The laser fabrication system according to claim 1, wherein the DMD introduces negative angular dispersion to the laser beam; and the system further comprises a dispersion compensation unit, configured to transfer the laser beam from the laser source to the DMD with a positive angular dispersion for neutralizing the negative angular dispersion.

3. The laser fabrication system according to claim 2, wherein the dispersion compensation unit includes a blazed transmission grating and a mirror.

4. The laser fabrication system according to claim 1, wherein wavefront information for wavefront correction is further included in the scanning binary hologram.

5. The laser fabrication system according to claim 1, wherein the laser beam from the laser source is expanded to match an aperture of the DMD.

6. The laser fabrication system according to claim 1, further comprising an objective lens via a set of relay optics configured to focus the shaped laser beam.

7. The laser fabrication system according to claim 6, wherein the set of relay optics is a 4-f system consisting of two lenses.

8. The laser fabrication system according to claim 6, wherein the spatial filter is placed at a back focal plane of the set of relay optics to spatially select a non-zero order beam diffracted from the scanning binary hologram.

9. The laser fabrication system according to claim 1, further comprising a microscopic imaging system configured to monitor fabrication processes performed by the shaped laser beams.

10. The laser fabrication system according to claim 1, further comprising a position stage configured to mount and maneuver samples to a location where the sample will be laser processed.

11. The laser fabrication system according to claim 1, wherein the system further comprises a lens pair comprising a first lens L1 and a second lens L2, configured to collimate and expand the laser beam and image the beam onto the DMD, wherein the first lens L1 has a focal length $f_{L1}$ and the second lens L2 has a focal length $f_{L2}$, wherein a ratio of $f_{L1}$ to $f_{L2}$ is equal to a ratio of cone angles $\Delta\theta_G$ and $\Delta\theta_D$, the ratio of cone angles $\Delta\theta_G$ and $\Delta\theta_D$ satisfying the following equation set:

$$\frac{\Delta\theta_G}{\Delta\theta_D} = \frac{m_G d_D \cos\theta_{iD}}{m_D d_G \cos\theta_{mG}},$$

wherein m is an integer indicating a diffraction order, d is a grating period, $\theta_i$ and $\theta_m$ are incident and diffraction angles of a $m^{th}$ order diffraction, respectively, and G and D are the grating and the DMD, respectively.

12. The laser fabrication system according to claim 1, wherein a plurality of binary holograms is superposed to form a target hologram of a target wavefront with a plurality of focal points, and the target hologram is used as the scanning hologram applied to the DMD.

13. The laser fabrication system according to claim 12, wherein the plurality of binary holograms is superimposed based on an equation:

$$h(i,j) = \begin{cases} 1, & -A(x,y) \le \sum_{k=1}^{n} B_k \sin\left(2\pi \frac{B_k(x,y)}{T_k} + \varphi_k(x,y)\right) \le A(x,y) \\ 0, & \text{otherwise} \end{cases}$$

wherein $A(x,y)\cdot\exp[i\varphi(x,y)]$ is the target wavefront including k focal points, $A(x,y)\in L[0,1]$ and $\varphi(x,y)$ represent an amplitude and a phase of an electric field, x and y are coordinates in Cartesian coordinate system;

wherein h(i, j) represents a binary value of micromirrors on the DMD at (i, j), and $B_k$, $R_k(x,y)$, $T_k$ and $\phi_k$ are relative amplitude factor, tilted phase, grating period, and phase for the $k^{th}$ focal point respectively.

14. A method for laser fabrication, comprising:
outputting a laser beam from a laser source;
shaping the laser beam with a scanning binary hologram by a digital micromirror device (DMD) functioning as a programmable binary mask coded with the scanning binary hologram synthesized from more than one binary hologram;
  focusing the shaped laser beam to photo-sensitive resins for parallel fabrication with a single or multiple shaped laser points; and
spatially selecting a non-zero order beam diffracted from the scanning binary hologram, wherein the non-zero order beam is −1st or +1st order beam, wherein the selected non-zero order beam is focused to the photo-sensitive resins.

15. The method according to claim 14, further comprising neutralizing an angular dispersion introduced by the DMD to the laser beam.

16. The method according to claim 14, wherein the scanning binary comprises wavefront modulating information for wavefront correction.

* * * * *